(12) United States Patent
Deshmukh et al.

(10) Patent No.: US 8,572,569 B2
(45) Date of Patent: Oct. 29, 2013

(54) MODIFIED IMPLEMENTATION OF A DEBUGGER WIRE PROTOCOL AND COMMAND PACKET

(75) Inventors: Kiran Deshmukh, Bangalore (IN); Kumar Ashish, Bangalore (IN); Pankaj Chand, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 993 days.

(21) Appl. No.: 12/634,132

(22) Filed: Dec. 9, 2009

(65) Prior Publication Data

US 2011/0138359 A1 Jun. 9, 2011

(51) Int. Cl.
*G06F 9/44* (2006.01)
*G06F 15/16* (2006.01)

(52) U.S. Cl.
USPC .......................................... 717/124; 709/236

(58) Field of Classification Search
None
See application file for complete search history.

(56) References Cited

U.S. PATENT DOCUMENTS

| | | | | |
|---|---|---|---|---|
| 5,455,721 | A * | 10/1995 | Nemazie et al. | 360/51 |
| 5,469,150 | A * | 11/1995 | Sitte | 340/3.42 |
| 5,502,826 | A * | 3/1996 | Vassiliadis et al. | 712/213 |
| 5,732,234 | A * | 3/1998 | Vassiliadis et al. | 712/200 |
| 6,313,763 | B1 * | 11/2001 | Lambert | 341/50 |
| 7,350,194 | B1 * | 3/2008 | Alpern | 717/124 |
| 8,223,869 | B2 * | 7/2012 | Bottero et al. | 375/265 |
| 8,269,612 | B2 * | 9/2012 | Horky et al. | 340/12.22 |
| 2009/0122891 | A1 * | 5/2009 | Bottero et al. | 375/265 |
| 2010/0007513 | A1 * | 1/2010 | Horky et al. | 340/825.22 |

OTHER PUBLICATIONS

Sun Microsystems Inc. "Java™ Debug Wire Protocol," crawled on Jul. 2, 2008 by Internet Archive Wayback Machine. pp. 1-5. Retrieved from web.archive.org on Mar. 5, 2013.*
Sun Microsystems Inc. "Java™ Platform Debugger Architecture Overview," crawled on Jul. 8, 2008 by Internet Archive Wayback Machine. pp. 1-3. Retrieved from web.archive.org on Mar. 5, 2013.*
"Java(tm) Debug Wire Protocol", downloaded on Nov. 5, 2009, pp. 1-7, http://java.sun.com/j2se/1.5.0/docs/guide/jpda/jdwp-spec.html.
"Java(tm) Debug Wire Protocol", downloaded on Nov. 5, 2009, pp. 1-52, http://java.sun.com/j2se/1.5.0/docs/guide/jpda/jdwp-protocol.html.
Java(tm) Platform Debugger Architecture, downloaded on Nov. 5, 2009, pp. 1-2, http://java.sun.com/j2se/1.5.0/docs/guide/jpda/index.html.
"Java(tm) Platform Debugger Architecture Overview", downloaded on Nov. 5, 2009, pp. 1-4, http://java.sun.com/j2se/1.5.0/docs/guide/jpda/jpda.html.
"Java(tm) Platform Debugger Architecture", downloaded on Nov. 5, 2009, pp. 1-5, http://java.sun.com/j2se/1.5.0/docs/guide/jpda/architecure.html.
"Java Platform Debugger Architecture", downloaded on Nov. 5, 2009, pp. 1-2, http://java.sun.com/javase/technologies/core/toolsapis/jpda/.

* cited by examiner

*Primary Examiner* — Don Wong
*Assistant Examiner* — Erika Kretzmer
(74) *Attorney, Agent, or Firm* — Miles & Stockbridge P.C.

(57) ABSTRACT

A client debugger application or a virtual machine includes a receiving module configured to receive a command packet of a debugging protocol from a computer. The command packet includes an identifier (ID) field. The client debugger application or the virtual machine also includes a parsing module configured to parse an ID from the ID field. One byte of the ID field doubles as a command set value and another byte of the ID field doubles as a command value. The client debugger application or the virtual machine further includes a debugging module configured to use the parsed ID, command set value and command value to perform at least one debugging operation.

23 Claims, 6 Drawing Sheets

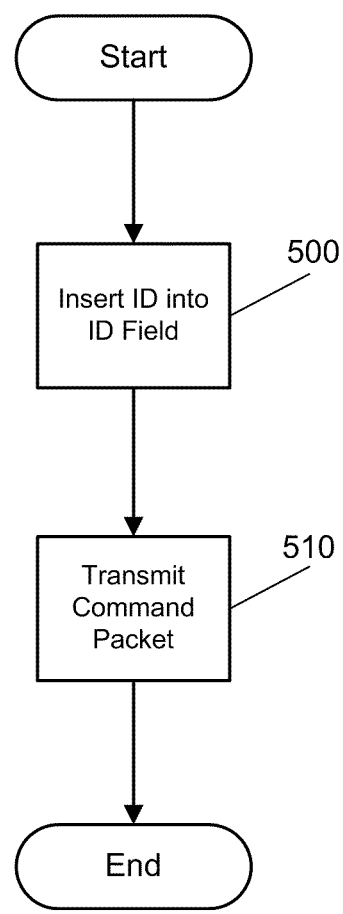

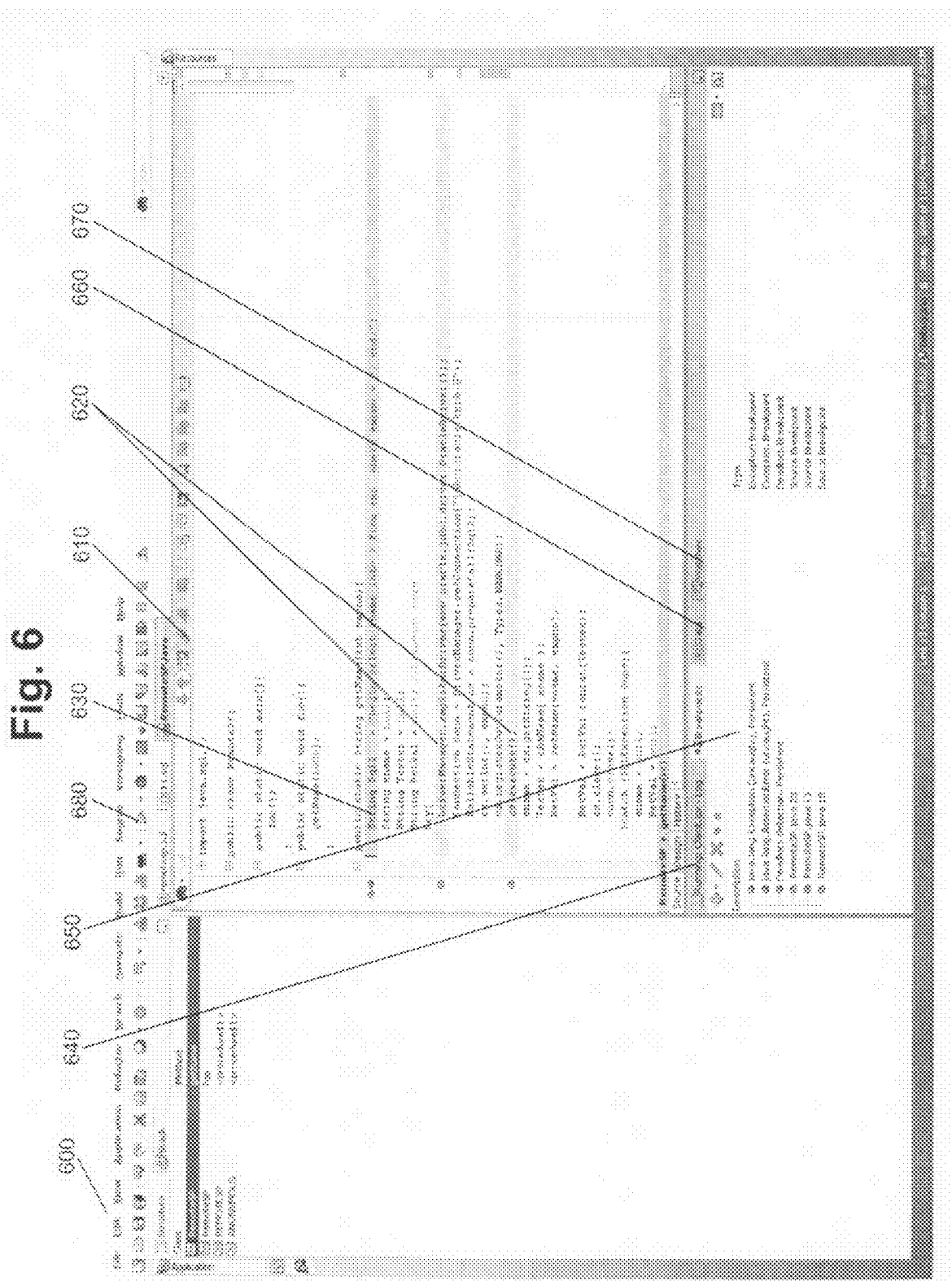

MODIFIED IMPLEMENTATION OF A DEBUGGER WIRE PROTOCOL AND COMMAND PACKET

FIELD

One embodiment is directed generally to computer systems, and in particular to debugging in computer systems.

BACKGROUND

JAVA DEBUG WIRE PROTOCOL (JDWP) is a standardized protocol used for communication by JAVA debugger clients with a JAVA VIRTUAL MACHINE (JVM). JDWP defines the structure of messages to be sent between the JAVA debugger clients and the JVM. For instance, in a JDWP command packet, 4 bytes are set aside in the header for an identifier (ID) and one byte is set aside in the header for each of the command set and the command. JDWP permits a debugger to operate in a different process on the same computer or on a remote computer with respect to the JVM.

SUMMARY

In some embodiments, a client debugger application or a virtual machine includes a receiving module configured to receive a command packet of a debugging protocol from a computer. The command packet includes an ID field. The client debugger application or the virtual machine also includes a parsing module configured to parse an ID from the ID field. One byte of the ID field doubles as a command set value and another byte of the ID field doubles as a command value. The client debugger application or the virtual machine further includes a debugging module configured to use the parsed ID, command set value and command value to perform at least one debugging operation.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which:

FIG. 5 is a flow diagram illustrating a process flow for preparing and transmitting command packets according to an embodiment of the present invention.

FIG. 6 is a screenshot view of a client debugger application according to an embodiment of the present invention.

DETAILED DESCRIPTION

In some embodiments, a client debugger application or a virtual machine may use a modified implementation of a debugging protocol where one byte of an ID field doubles as a command set value and another byte of the ID field doubles as a command value. This reduces the number of bytes that actually need to be written into, and parsed from, a command packet. These fields may then be used to perform at least one debugging operation.

In conventional implementations of JDWP, for example, four bytes of the command packet header are set aside for an ID. This ID field provides $2^{32}$ (4,294,967,296) unique IDs that are available to identify command/reply packet pairs. However, this number is much larger than what is needed for most practical purposes. Accordingly, it may be beneficial to incorporate one or more other values into the ID field. For instance, in some embodiments, the first two bytes of the ID field may be used as part of the ID, the third byte of the ID field may double as the command set value and the fourth byte of the ID field may double as the command value.

In this manner, the number of bytes that must be read/written by the JAVA debugger client application or JVM may be reduced since the command set and command fields designated by JDWP do not need to be written by the transmitting application or read by the receiving application, saving 2 bytes of read/write on each end. This leaves ($2^{16}$·(the number of possible command set values)·(the number of possible command values)) unique IDs that are available to identify command/reply packet pairs. When fewer than 256 command set and 256 command values are specified, the number of IDs that are available will be less than $2^{32}$.

In order to determine that the improved implementation of JDWP is to be used, one or more of the JAVA debugger client application and the JVM may exchange a special command indicating that an improved implementation of JDWP is to be used, such as implementations discussed herein, as opposed to a conventional implementation. The JDWP protocol can be extended to implement predefined, proprietary commands. Sending such a command may alert a recipient application that the improved implementation is to be used. Thus, JVMs and client debugger applications that include improved JDWP functionality may also operate with JVMs and client debugger applications that use conventional functionality.

While a JVM is often discussed in this application, any virtual machine may be used, such as the Common Language Runtime (CLR) by Microsoft®. Also, while JDWP is discussed as the debugging protocol in most examples herein, any debugging protocol that uses command packets may be used. For the purposes of this application, command packets are packets that may be used to request information from a target virtual machine, to control program execution, or both.

Figure 1:
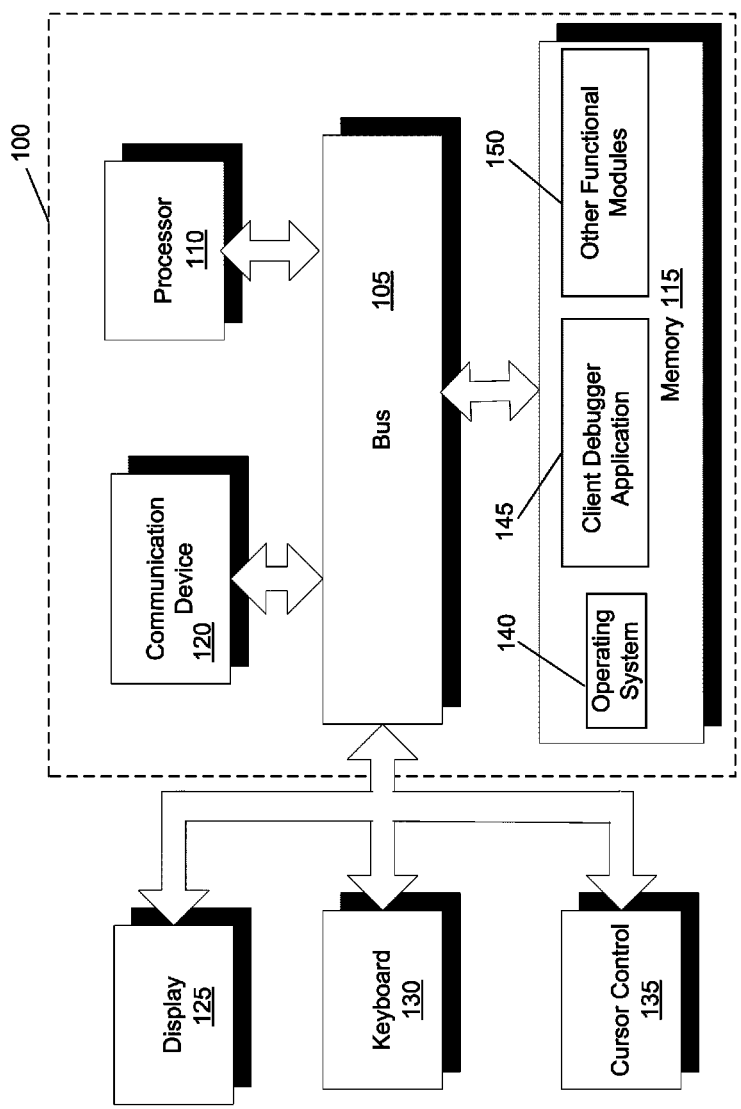
FIG. 1 is a block diagram illustrating a computer having a client debugger application that can implement an embodiment of the present invention.

FIG. 1 is a block diagram of a computer 100 that can implement an embodiment of the present invention. Computer 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Computer 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, computer 100 includes a communication device 120, such as a network interface card, to provide access to a network. Therefore, a user may interface with computer 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as status information. A keyboard 130 and a cursor control device 135, such as a computer mouse, is further coupled to bus 105 to enable a user to interface with computer 100.

In one embodiment, memory 115 stores software modules that provide functionality when executed by processor 110. The modules include an operating system 140 that provides operating system functionality for computer 100. The modules further include a debugger client application 145 that is configured to facilitate debugging. Computer 100 can be part of a larger system such as a cluster computing system, a distributed computing system, a cloud computing system, a "server farm" or any other system having multiple servers and/or computing devices. Computer 100 will typically include one or more additional functional modules 150 to include additional functionality. In some embodiments, client debugger application 145 may be part of operating system 140 or part of one or more other functional modules included in other functional modules 150, such as a JVM.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
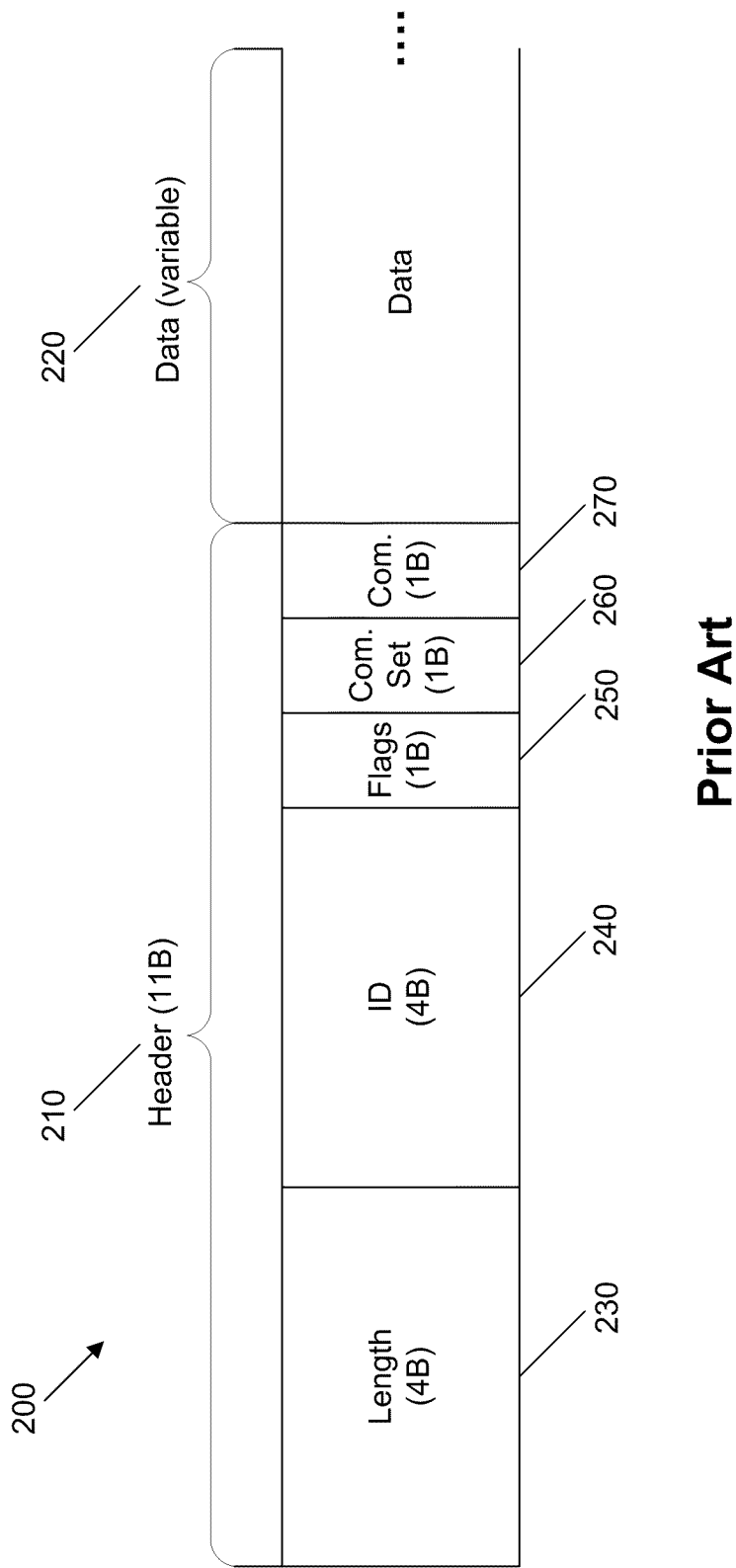
FIG. 2 is an architectural diagram of a JDWP command packet according to the conventional JDWP protocol.

FIG. 2 is an architectural diagram of a JDWP command packet 200 according to the conventional JDWP protocol. JDWP command packet 200 includes an eleven byte header portion 210 and a data portion 220. Data portion 220 may be of variable length, and may have a length of zero bytes in some cases.

Within header portion 210, a four byte length field 230, a four byte ID field 240, a one byte flags field 250, a one byte command set field 260 and a one byte command field 270 are included. Length field 230 is the size, in bytes, of the entire packet, including the length field itself. Since the header size is eleven bytes, the value of length field 230 would be eleven if no data is included in the packet. ID field 240 is used to uniquely identify each packet command/reply pair. A reply packet is sent in response to a command packet and information indicating the success or failure of a command. Reply packets may also carry data requested in a command. The reply packet has the same ID as the command packet to which it replies.

Flags field 250 is used to alter how a command is queued and processed and to tag command packets that originate from a target VM. The reply bit, when set with the hex value 0x80, indicates that the packet is a reply. Command set field 260 provides a means for grouping commands. The values 0x00 through 0x3F indicate sets of commands that are sent to the target JVM, the values 0x40 through 0x7F indicate sets of commands that are sent to the debugger and the values 0x80 through 0xFF indicate vendor-defined commands and extensions. Command field 270 identifies a particular command in a command set. Command field 270, together with command set field 260, is used to indicate how the command packet should be processed.

Figure 3:
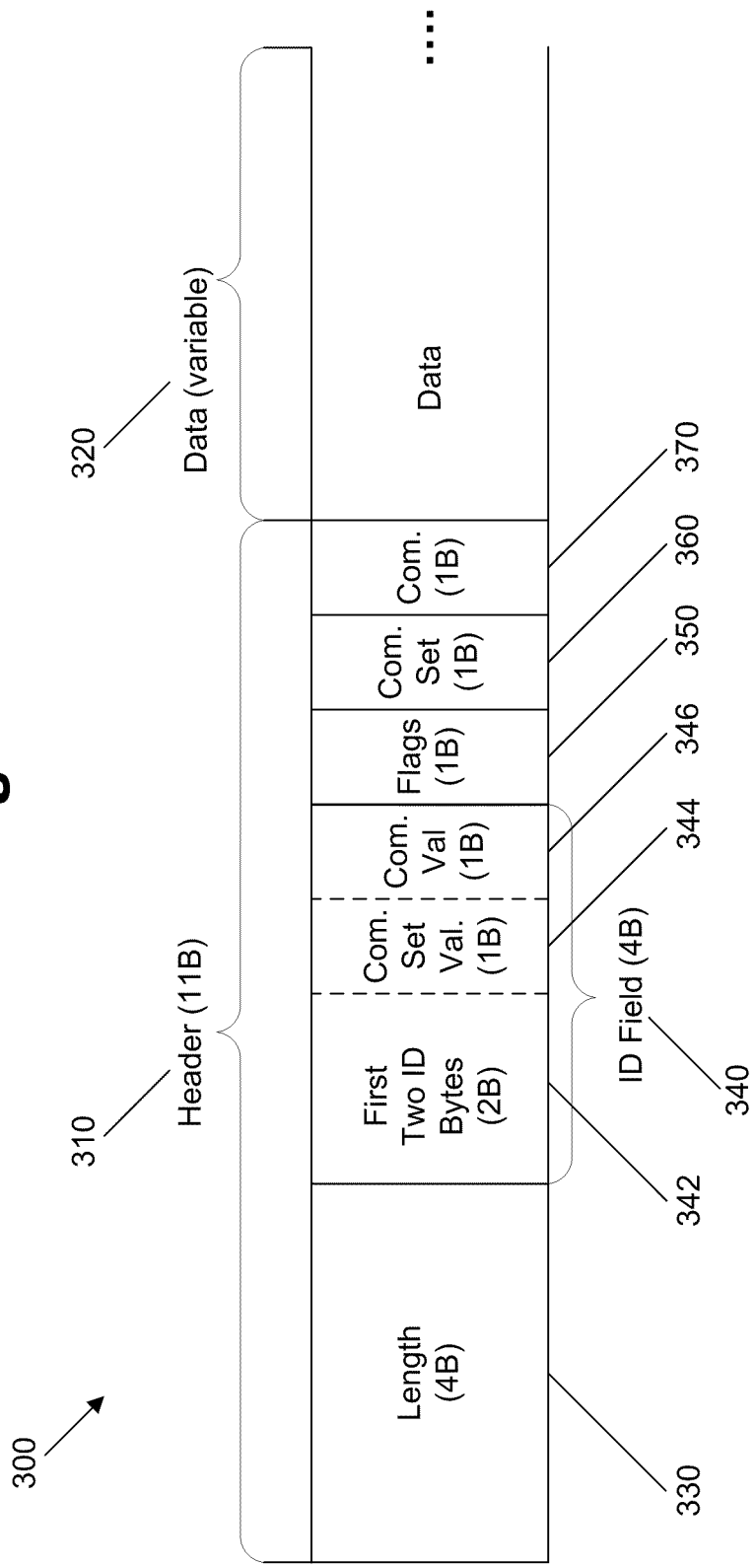
FIG. 3 is an architectural diagram of a JDWP command packet according to an embodiment of the present invention.

FIG. 3 is an architectural diagram of a modified JDWP command packet 300 according to an embodiment of the present invention. Per the above, while JDWP is discussed as the debugging protocol in this example, any debugging protocol that uses command packets may be used. Modified JDWP command packet 300 includes an eleven byte header portion 310 and a data portion 320. Data portion 320 may be of variable length, and may have a length of zero bytes in some cases.

Within header portion 310, a four byte length field 330, a four byte ID field 340, a one byte flags field 350, a one byte command set field 360 and a one byte command field 370 are included. Length field 330 is the size, in bytes, of the entire packet, including the length field itself. Since the header size is eleven bytes, the value of length field 330 would be eleven if no data is included in the packet. The first two bytes 342 of ID field 340 are used as part of the ID that identifies a command/reply pair, the third byte doubles as both the third byte of the ID and a one byte command set value 344, and the fourth byte doubles as both the fourth byte of the ID and a one byte command value 346. As such, the values of the command set and command fields are included as part of the ID. Thus, command set field 360 and command field 370 does not need to be read/written, as compared with a conventional JDWP implementation shown in FIG. 2 where all fields must be written. While this embodiment shows the command value and command set value being included in the command ID field, it is understood that the position of the data in the field may be changed and/or one of these fields may be removed.

Figure 4:
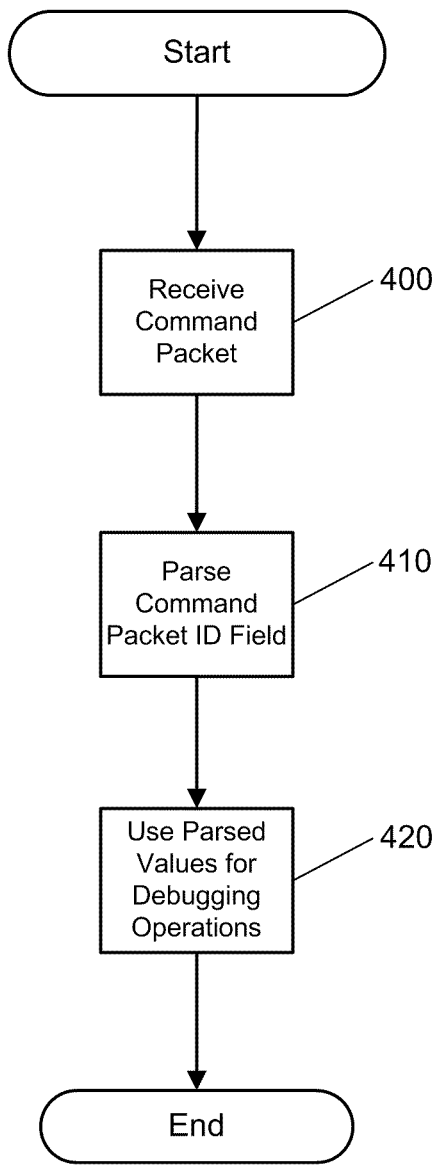
FIG. 4 is a flow diagram illustrating a process flow for receiving and using command packets according to an embodiment of the present invention.

FIG. 4 is a flow diagram illustrating a process flow for receiving and using command packets according to an embodiment of the present invention. In some embodiments, the functionality of FIG. 4, and FIG. 5 below, is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 4 may be performed, for example, by computer 100 of FIG. 1 via client debugger application 145, by a JVM, or by any other virtual machine. While the process flow is shown in a particular order, it is understood that other orders of execution could occur. In this example, the field structure from FIG. 3 is used. In FIG. 4, the process flow begins with command packet 300 being received at 400. Command packet 300 may be a command packet of JDWP, for example, and includes ID field 340. ID field 340 contains an ID 342 for the associated command/replay packet pair, one byte of which doubles as a command set value 344 and another byte of which doubles as a command value 346.

ID 342 is parsed from ID field 340 at 410. One byte of the ID is used as a command set and another byte of the ID is used as a command. The parsed values are then used at 420 to determine at least one associated debugging operation that is to be performed and thereafter to perform the at least one debugging operation. For instance, the command set value 344 and command value 346 may indicate that a break point is to be set.

Command packets are received by client debugger applications or virtual machines, such as JVMs, depending on the context. For instance, a command packet requesting to set a breakpoint may be received by a virtual machine, whereas a command packet indicating that an exception occurred during program execution may be received by a client debugger application (and vice versa regarding which application prepares the command packet). Accordingly, both the client debugger application and the virtual machine may parse command packets as discussed above.

FIG. 5 is a flow diagram illustrating a process flow for preparing and transmitting command packets according to an embodiment of the present invention. In some embodiments, the process of FIG. 5 may be performed, for example, by computer 100 of FIG. 1 via client debugger application 145, by a JVM, or by any other virtual machine. While the process flow is shown in a particular order, it is understood that other orders of execution could occur. In this example, the field structure from FIG. 3 is used. In FIG. 5, the process flow begins with inserting ID 342 into ID field 340 of command packet 300 at 500. Thereafter, command packet 300 is transmitted to a computer at 510. One byte of the ID doubles as a command set value and another byte of the ID doubles as a command value. In some embodiments, the computer running the client debugger application and the virtual machine may be the same. In such a case, the transmitting involves providing command packet 300 to another software application (debugger or virtual machine) running on the same computer. The computer then uses at least one of the ID and one or more of the one or more other field values to perform at least one debugging operation.

FIG. 6 is a screenshot view 600 of a client debugger application according to an embodiment of the present invention. The client debugger application has an editing window 610 that displays a source file that is being debugged. Breakpoints 620 may be set or unset by a user by clicking a mouse, for instance, and selected breakpoints are highlighted as shown. The current statement being executed 630 is also highlighted and may be highlighted in a different color from breakpoints so a user can easily distinguish between these. An execution stack pane 640 (currently hidden) of the client debugger application shows the execution stack (i.e., the current path that the execution has followed to reach the current state). A breakpoint pane 650 shows the breakpoints that the user has set in this file. A data pane 660 and a watches pane 670 (both currently hidden) allow the user to examine runtime data from the source file. A toolbar 680 at the top of the client debugger application screen has various buttons for performing operations such as starting debugging, stopping debugging, step-through, step-over, step-out and continue operations.

In some embodiments, client debugger applications and virtual machines may communicate using either a conventional debugging protocol, such as conventional JDWP, or a modified debugging protocol as discussed herein. When using a modified debugging protocol, a client debugger or a virtual machine may use a modified implementation of the debugging protocol that reduces the number of bytes that are actually used in the header of a command packet. The ID and at least one other field value, such as a command set and/or command value, may be parsed from the ID field. One byte of the ID may double as a command set value and another byte of the ID may double as a command value. One or more of these fields may then be used to perform at least one debugging operation. Thus, the number of bytes that are actually read/written may be reduced.

While the term "computer" has been used in the description of some embodiments of the present invention, the invention may be applied to many types of network computing devices. For purposes of this invention, the term "computer" includes rack computing systems, cloud computing systems, distributed computing systems, personal computers, laptops, cell phones, personal digital assistants, tablet computing devices, mainframes, any networked devices that perform computing operations, and the like.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer-readable medium having instructions stored thereon that, when executed by a processor, cause the processor to:
receive a command packet of a debugging protocol from a computer, wherein the command packet comprises an identifier (ID) field and a variable data field;
parse an ID from the ID field, wherein one byte of the ID field doubles as a command set value and another byte of the ID field doubles as a command value; and
use the parsed ID, the command set value and command value to perform at least one debugging operation, wherein the command set value is used to group commands, and the command value identifies a command in the command set value.

2. The computer-readable medium of claim 1, wherein the command packet received from the computer is created by a client debugger application or a virtual machine.

3. The computer-readable medium of claim 1, wherein the command packet is a command packet of a JAVA DEBUG WIRE PROTOCOL.

4. The computer-readable medium of claim 1, wherein, prior to receiving the command packet, a previous command packet is received indicating that subsequent command packets will have the ID, the command set value and the command value in the ID field.

5. The computer-readable medium of claim 1, wherein a range of IDs that may be indicated by the ID field is:

$$2^{16} \cdot P_{CS} \cdot P_C$$

wherein $P_{CS}$ is the number of possible command set values and $P_C$ is the number of possible command values.

6. An apparatus, comprising:
a processor;
a non-transitory memory coupled to the processor and storing the following modules that can be executed by the processor:
a receiving module configured to receive a command packet of a debugging protocol from a computer, wherein the command packet comprises an identifier (ID) field and a variable data field;
a parsing module configured to parse an ID from the ID field, wherein one byte of the ID field doubles as a command set value and another byte of the ID field doubles as a command value; and
a debugging module configured to use the parsed ID, command set value and command value to perform at least one debugging operation, wherein the command set value is used to group commands, and the command value identifies a command in the command set value.

7. The apparatus of claim 6, wherein the apparatus comprises a client debugger or a virtual machine.

8. The apparatus of claim 6, wherein the command packet is a command packet of a JAVA DEBUG WIRE PROTOCOL.

9. The apparatus of claim 6, wherein when a previous command packet is received prior to receiving the command packet, subsequent command packets will have the ID, the command set value and the command value in the ID field.

10. The apparatus of claim 9, wherein the apparatus is configured to parse command packets using a conventional implementation of a JAVA DEBUG WIRE PROTOCOL absent receipt of the previous command packet.

11. The apparatus of claim 6, wherein a range of IDs that may be indicated by the ID field is:

$$2^{16} \cdot P_{CS} \cdot P_C$$

wherein $P_{CS}$ is the number of possible command set values and $P_C$ is the number of possible command values.

12. A computer-implemented method for receiving and using command packets, comprising:
receiving a command packet of a JAVA DEBUG WIRE PROTOCOL from a computer, wherein the command packet comprises a four byte identifier (ID) field and a variable data field;
parsing an ID from the ID field, wherein one byte of the ID field doubles as a command set value and another byte of the ID field doubles as a command value; and
using the parsed ID, command set value and command value to perform at least one debugging operation, wherein the command set value is used to group commands, and the command value identifies a command in the command set value.

13. The computer-implemented method of claim 12, wherein the command packet received from the computer is created by a client debugger application or a virtual machine.

14. The computer-implemented method of claim 12, wherein, prior to receiving the command packet, a previous command packet is received indicating that subsequent command packets will have the ID, the command set value and the command value in the ID field.

15. The computer-implemented method of claim 13, wherein a range of IDs that may be indicated by the ID field is:

$$2^{16} \cdot P_{CS} \cdot P_C$$

wherein $P_{CS}$ is the number of possible command set values and $P_C$ is the number of possible command values.

16. A non-transitory computer-readable medium having instructions stored thereon that, when executed by a processor, cause the processor to:
insert an identifier (ID) into an ID field of a command packet of a debugging protocol; and
transmit the command packet to a computer, wherein the command packet comprises a variable data field;
wherein one byte of the ID field doubles as a command set value and another byte of the ID field doubles as a command value;
wherein the command set value is used to group commands, and the command value identifies a command in the command set value.

17. The computer-readable medium of claim 16, wherein the command packet is a command packet of a JAVA DEBUG WIRE PROTOCOL.

18. The computer-readable medium of claim 16, wherein, prior to transmitting the command packet, a previous command packet is transmitted indicating that subsequent command packets will have the ID, the command set value and the command value in the ID field.

19. The computer-readable medium of claim 16, wherein a range of IDs that may be indicated by the ID field is:

$$2^{16} \cdot P_{CS} \cdot P_C$$

wherein $P_{CS}$ is the number of possible command set values and $P_C$ is the number of possible command values.

20. A computer-implemented method for preparing and transmitting command packets, comprising:
inserting an identifier (ID) into an ID field of a command packet of a debugging protocol; and
transmitting the command packet to a computer, wherein the command packet comprises a variable data field;
wherein one byte of the ID field doubles as a command set value and another byte of the ID field doubles as a command value;

wherein the command set value is used to group commands, and the command value identifies a command in the command set value.

21. The computer-implemented method of claim 20, wherein the command packet is a command packet of a JAVA DEBUG WIRE PROTOCOL.

22. The computer-implemented method of claim 20, wherein, prior to transmitting the command packet, a previous command packet is transmitted indicating that subsequent command packets will have the ID, the command set value and the command value in the ID field.

23. The computer-implemented method of claim 20, wherein a range of IDs that may be indicated by the ID field is:

$$2^{16} \cdot P_{CS} \cdot P_C$$

wherein $P_{CS}$ is the number of possible command set values and $P_C$ is the number of possible command values.

* * * * *

UNITED STATES PATENT AND TRADEMARK OFFICE
CERTIFICATE OF CORRECTION

| | | |
|---|---|---|
| PATENT NO. | : 8,572,569 B2 | Page 1 of 1 |
| APPLICATION NO. | : 12/634132 | |
| DATED | : October 29, 2013 | |
| INVENTOR(S) | : Deshmukh et al. | |

It is certified that error appears in the above-identified patent and that said Letters Patent is hereby corrected as shown below:

On the title page

Item 54, column 1, under "title", delete "MODIFIED IMPLEMENTATION OF A DEBUGGER WIRE PROTOCOL AND COMMAND PACKET" and insert -- "MODIFIED IMPLEMENTATION OF JAVA DEBUG WIRE PROTOCOL" --, therefor.

Item 56, column 2, under "Other Publications", line 20, delete "architecure" and insert -- architecture --, therefor.

In the specification

In column 1, under "title", delete "MODIFIED IMPLEMENTATION OF A DEBUGGER WIRE PROTOCOL AND COMMAND PACKET" and insert -- "MODIFIED IMPLEMENTATION OF JAVA DEBUG WIRE PROTOCOL" --, therefor.

Signed and Sealed this
First Day of March, 2016

Michelle K. Lee
*Director of the United States Patent and Trademark Office*